Patented Aug. 21, 1923.

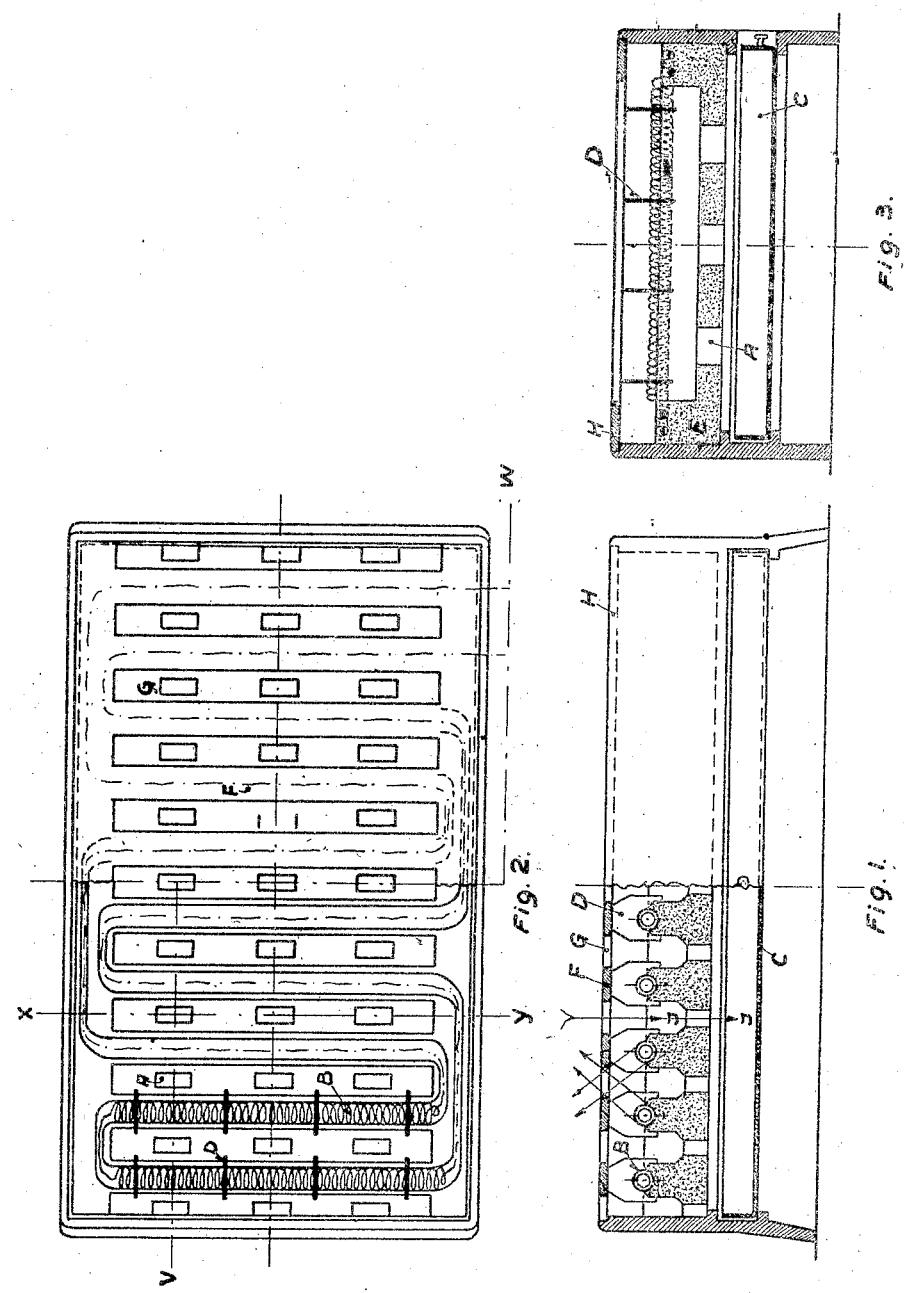

1,465,478

UNITED STATES PATENT OFFICE.

ALFRED NIELSEN, OF HOVIK, NEAR CHRISTIANIA, NORWAY.

ELECTRIC HEATING PLATE.

Application filed September 6, 1922. Serial No. 586,507.

*To all whom it may concern:*

Be it known that I, ALFRED NIELSEN, a subject of the King of Norway, and residing at Hovik, near Christiania, Norway, have invented certain new and useful Improvements in Electric Heating Plates, of which the following is a specification.

The electric heating plates of the open wire type, in which the heating wire or spiral is placed without protection on insulating material have the drawback, that overboil and spillage from the cooking vessel will soil the heating wire and stick to it in torrefying and carbonizing. These substances can be removed mechanically only at the risk of hurting the heating wires. To clean the wire by burning off the fouling substances is wearisome and also annoying due to the bad smell emitted. Moreover the repeated annealing of the heating wire in contact with carbonizing substances will have a very harmful effect upon the wire and shorten its life.

By the present invention these inconveniences are avoided, as it is possible to prevent the spillage from the cooking vessel from reaching the heating wire, and at the same time the heat from the incandescent wire is utilized practically to the same extent as in the heating plates of the open wire type hitherto in use.

The invention is illustrated in the annexed drawings, in which—

Fig. 1 represents a side elevation and vertical section through one half of the heating plate on the line *v—w* of Fig. 2, Fig. 2 a top view of the apparatus, the covering plate being removed, and Fig. 3 a second vertical section on the line *x—y* of Fig. 2 and therefore at a right angle with the section shown in Fig. 1.

The heating wire B is arranged in suitable grooves formed in a bed E of fire-proof insulating material.

Grooves or channels I are formed in bed E between the grooves and in the bottoms of the grooves, slots A are preferably formed at intervals the object of which will be hereinafter explained. Above the heating wires and at some distance from the same a perforated plate H of iron or other metal is provided, on which the cooking-vessel is to be placed. The metal plate has the shape of a grate, the bars F of which are situated above the heating wires or spirals thus sheltering the latter, while the openings G of the grate correspond with the grooves in the insulating bed of the heating wires.

If some substance is spilt from the cooking vessel on the grate, this substance will not reach the heating wires but pass down through the slots in the insulating material to the bottom plate of the apparatus, from where it may be removed. In order to facilitate this removal it is convenient to make the bottom plate detachable. Most adequately it is given the shape of a drawer, that is easily pulled out for cleaning and then replaced.

In order to prevent the heating spirals from coming into contact with the plate H above them, small insulating pieces D for instance of mica are inserted between the plate H and the wire. These insulating pieces may be attached either to the plate H or to the insulating bed of the spiral.

Instead of forming the grooves I in the bed and the slots A in the bottoms of the grooves, the heating coils or wires may be mounted in separate fire-proof insulating bars spaced apart to form open channels to permit the spillage to pass directly to the bottom plate C. In the structure shown the spillage collects in the channels and may be scraped away without injuring the heating wire.

The latter embodiment has the advantage, that the bottom plate is better protected against the heat, and likewise that the air-draught through the apparatus is easier to regulate.

From the preceding it will be evident, that by the arrangement above described the soiling of the apparatus and the inconviences connected therewith are avoided, and these advantages are obtained without relinquishing to any considerable extent the principle of the open wire system of heat transfer by direct radiation from the heating wires to the cooking-vessel. Through the openings G the vessel receives the greatest part of the heat by direct radiation, and where the heat rays do not inside direct on the cooking-vessel, the heat is absorbed by the bars F, and transferred to the vessel.

It is understood that the invention is not confined to any peculiar disposition of the heating wire. The invention being applicable with parallel arrangement of the heating wires as well as with an arrangement in spirals or in concentric rings of said wires.

I claim:

1. An electric heater comprising a bare heating wire, an insulating support for the latter arranged to form spaces between portions of the wire, and a cover plate mounted above the latter and having openings corresponding to said spaces.

2. An electric heater, comprising a body of insulating material forming a series of channels, bare heating wires mounted on the insulating material parallel to the channels, a cover plate mounted above the insulating material and having openings therein above the channels, and a bottom plate mounted below the insulating material.

3. An electric heater, comprising a body of insulating material having a series of grooves formed therein, bare heating wires mounted in the grooves, channels formed in the insulating material between the wires, and a cover plate mounted above the latter and having openings corresponding to the channels.

4. An electric heater, comprising bare heating wires, a bed of insulating material having grooves in which the wires are mounted, channels formed in the bed between the grooves and having drain openings in their bottoms, a cover plate mounted above and spaced from the bed and having openings therein corresponding to the channels, and a bottom plate mounted below the bed, for the purpose specified.

In witness whereof, I affix my signature.

ALFRED NIELSEN.